United States Patent
Yoshizawa

(10) Patent No.: US 8,483,502 B2
(45) Date of Patent: Jul. 9, 2013

(54) IMAGE PROCESSING APPARATUS INCLUDING ERROR DIFFUSION PROCESSING WHICH ADDS GREEN NOISE CHARACTERISTICS, IMAGE PROCESSING METHOD INCLUDING ERROR DIFFUSION PROCESSING WHICH ADDS GREEN NOISE CHARACTERISTICS AND A COMPUTER READABLE STORAGE MEDIUM STORING PROGRAM THEREOF

(75) Inventor: Masanori Yoshizawa, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/437,306

(22) Filed: Apr. 2, 2012

(65) Prior Publication Data

US 2012/0257840 A1      Oct. 11, 2012

(30) Foreign Application Priority Data

Apr. 7, 2011   (JP) ................................. 2011-084976

(51) Int. Cl.
*G06K 9/00*        (2006.01)
*H04N 1/40*        (2006.01)

(52) U.S. Cl.
USPC ............................ 382/252; 358/465; 358/466

(58) Field of Classification Search
USPC ......................................................... 382/252
See application file for complete search history.

(56) References Cited

U.S. PATENT DOCUMENTS

| | | | |
|---|---|---|---|
| 5,675,716 A * | 10/1997 | Shu | ................................. 358/1.9 |
| 6,333,793 B1 | 12/2001 | Kobayashi | |
| 6,493,112 B1 * | 12/2002 | Arce et al. | .................... 358/3.19 |
| 6,671,068 B1 * | 12/2003 | Chang et al. | ................... 358/1.9 |
| 6,778,299 B2 * | 8/2004 | Lin et al. | ..................... 358/3.03 |
| 6,798,537 B1 * | 9/2004 | Lau et al. | ........................ 358/1.9 |
| 6,847,732 B1 * | 1/2005 | Sakatani | ...................... 382/167 |
| 6,920,243 B2 * | 7/2005 | Damera-Venkata | .......... 382/162 |
| 7,483,169 B2 * | 1/2009 | Murakami | ..................... 358/1.9 |
| 7,518,754 B2 * | 4/2009 | Cooper et al. | ............... 358/3.03 |
| 7,580,074 B2 * | 8/2009 | Kuo et al. | ................ 348/333.01 |
| 8,169,664 B2 * | 5/2012 | Kawamura | ................... 358/3.03 |

(Continued)

FOREIGN PATENT DOCUMENTS

| | | |
|---|---|---|
| EP | 0 866 602 | 9/1998 |
| EP | 2 107 791 | 10/2009 |
| JP | 2008-219291 | 9/2008 |

OTHER PUBLICATIONS

Daniel L. Lau and Gonzalo R. Arce, "Modern Digital Halftoning".

(Continued)

*Primary Examiner* — Randolph I Chu
(74) *Attorney, Agent, or Firm* — Lucas & Mercanti, LLP

(57) ABSTRACT

An image processing apparatus including an input unit which inputs a pixel value of a multi-level notice pixel, a first add unit which acids an error value to the input value, a second add unit which adds a green noise value to the input value, a threshold processing unit which outputs an binarized output values a green noise calculation unit which calculates the green noise value, a subtract unit which calculates an error value due to binarization, an error diffusion unit which diffuses the calculated error value to an untreated pixel which is not yet binarized and a correction processing unit which adds a positive first offset to the error value to perform a correction and outputs the corrected error value to the first add unit.

12 Claims, 11 Drawing Sheets

U.S. PATENT DOCUMENTS

| | | | |
|---|---|---|---|
| 8,169,665 B2* | 5/2012 | Wong et al. | 358/3.04 |
| 8,279,489 B2* | 10/2012 | Kawamura | 358/3.03 |
| 8,390,891 B2* | 3/2013 | Kawamura | 358/3.03 |
| 2002/0145758 A1* | 10/2002 | Lin et al. | 358/3.03 |
| 2003/0038953 A1* | 2/2003 | Damera-Venkata | 358/1.9 |
| 2003/0210430 A1* | 11/2003 | Nose et al. | 358/2.1 |
| 2004/0010633 A1 | 1/2004 | Ishikawa | |
| 2006/0203280 A1* | 9/2006 | Kobayashi et al. | 358/1.14 |
| 2006/0274374 A1* | 12/2006 | Murakami | 358/3.03 |
| 2007/0041053 A1* | 2/2007 | Cooper et al. | 358/3.03 |
| 2007/0296990 A1* | 12/2007 | Kakutani | 358/1.9 |
| 2008/0259361 A1* | 10/2008 | Kakutani | 358/1.8 |
| 2009/0109490 A1* | 4/2009 | Lau et al. | 358/3.06 |
| 2009/0251735 A1* | 10/2009 | Kawamura | 358/3.03 |
| 2009/0251736 A1* | 10/2009 | Kawamura | 358/3.03 |
| 2010/0091331 A1* | 4/2010 | Kawamura | 358/3.01 |
| 2010/0245927 A1* | 9/2010 | Wong et al. | 358/3.26 |
| 2011/0063684 A1* | 3/2011 | Kakutani | 358/3.03 |
| 2012/0243013 A1* | 9/2012 | Kakutani | 358/1.9 |
| 2012/0307273 A1* | 12/2012 | Jinno | 358/1.9 |

OTHER PUBLICATIONS

EP Search Report 12 16 3067.
Output Dependent Feedback in Error Diffusion Halftoning, Raph Levien, Levien Instrument Co., McDowell, Virginia.

* cited by examiner

FIG.2

|   | 1 | 2 | 3 | 4 | 5 |
|---|---|---|---|---|---|
| 1 | 0 | 0 | 0 | 0 | 0 |
| 2 | 0 | 0 | 0.5 | 0 | 0 |
| 3 | 0 | 0.5 | * | | |

*FIG.3*

|   | i |   |   |   |   |
|---|---|---|---|---|---|
|   | 1 | 2 | 3 | 4 | 5 |
| 3 |   |   | * | 0.5 | 0 |
| 4 | 0 | 0 | 0.5 | 0 | 0 |
| 5 | 0 | 0 | 0 | 0 | 0 | j

IMAGE PROCESSING APPARATUS INCLUDING ERROR DIFFUSION PROCESSING WHICH ADDS GREEN NOISE CHARACTERISTICS, IMAGE PROCESSING METHOD INCLUDING ERROR DIFFUSION PROCESSING WHICH ADDS GREEN NOISE CHARACTERISTICS AND A COMPUTER READABLE STORAGE MEDIUM STORING PROGRAM THEREOF

CROSS REFERENCE TO RELATED APPLICATION

This Application claims the benefit of priority of Japanese Patent Application No JP2011-084976 filed on Apr. 7, 2011, the entire contents of which are hereby incorporated by reference.

BACKGROUND OF THE INVENTION

1. Field of the Invention

The present invention relates to an image processing apparatus including error diffusion processing by which green noise characteristics is added, an image processing method including error diffusion processing by which green noise characteristics is added and a computer readable storage medium storing a program thereof.

2. Description of Related Art

Conventionally, there is known a configuration where a green noise characteristic is added when binarizing an image by error diffusion processing (for example, see JP2008-219291 and Daniel L. Lau and Gonzalo R. Arce, "Modern Digital Halftoning"). Concentration of dots increases in the image to which green noise characteristic is added and the image is to have a frequency characteristic having number of frequency components of intermediate frequency.

FIG. 11 illustrates a basic conventional configuration of error diffusion processing by which a green noise characteristic is added.

An input unit 17 inputs a pixel value of multi-level notice pixel on a pixel to pixel basis. The first add unit 11 adds an error value diffused with respect to the notice pixel by the error diffusion unit 16 to the input value of the notice pixel which is input from the input unit 17 and outputs the sum thereof to the second add unit 12. The second add unit 12 adds the green noise value which is calculated by the green noise calculation unit 14 to the input value to which the error value is added and outputs the sum thereof to the threshold processing unit 13. The threshold processing unit 13 binarizes the input value to which the error value and the green noise value are added by using a threshold and output the binarized output value.

The green noise calculation unit 14 calculates the green noise value to be added to the notice pixel by using the output value which is output from the threshold processing unit 13. In particular, the green noise calculation unit 14 weights the output values of the pixels which are binarized by the threshold processing unit 13, the pixels positioning around the notice pixel, and obtains a green noise value by multiplying the sum of the weighted output values by a feedback coefficient. The calculated green noise value is added to the input value of the notice pixel by the second add unit 12.

The subtract unit 15 subtracts the input value of the notice pixel to which the error value is added by the first add unit 11 from the output value of the notice pixel which is output from the threshold processing unit 13 and calculates the error value before and after binarization. The error diffusion unit 16 weights the error value which is output from the subtract unit 15, and thereafter, diffuses the error value to the pixels which are not yet binarized by the threshold processing unit 13, which are positioning around the notice pixel. When the untreated surrounding pixels are to be treated as a notice pixel, the diffused error value is added to the input value of the surrounding pixels by the first add unit 11.

The above described error diffusion processing is a method for feeding back the output values of the binarized surrounding pixels to the pixel value of the notice pixel. When dots are to be output in the surrounding pixels of the notice pixel, a dot is also readily output in the notice pixel by the feedback. Therefore, dots tend to be concentrated. As a result, concentration of dots increases, and stable density reproduction and noise reduction can be realized.

However, according to the conventional configuration of adding green noise characteristics, when a halftone image area is treated after a halftone to high density image area and a low density image area are treated in this order, there may be a case where the original image cannot be sufficiently reproduced. For example, when thin lines are included in the halftone image area, the thin lines may be fragmentary.

This is because although dots are output intensively by the green noise value which is generated at the time of processing the halftone to high density image area, the image area to be treated next is in the low density area and generates a great negative error. The negative error is not canceled out when the low density image area is to be treated and is accumulated. The accumulated negative error acts greatly on untreated image so as not to output dots. That is, the negative error which is held in the low density image area is diffused in the halftone image area, and dots are not output where they should be output causing reproducibility of an original image be degraded in such way the halftone image area being partially missing.

SUMMARY OF THE INVENTION

It is, therefore, a main object of the present invention is to improve reproducibility of an image in error diffusion processing which adds green noise characteristics.

In order to achieve the above object, according to one aspect of the present invention, an image processing apparatus includes an input unit which inputs a pixel value of a multi-level notice pixel on a pixel to pixel basis, a first add unit which adds an error value which is diffused with respect to a notice pixel to the input value of the multi-level notice pixel which is input from the input unit, a second add unit which adds a green noise value to the input value which is input from the first add unit, a threshold processing unit which outputs an binarized output value, the output value being obtained by binarizing the input value of the notice pixel to which the error value and the green noise value are added by using a threshold, a green noise calculation unit which calculates the green noise value to be added to the input value of the notice pixel by using an output value of a treated pixel which is binarized by the threshold processing unit and positioned at a predetermined position around the notice pixel, a subtract unit which calculates an error value due to binarization by subtracting the input value of the notice pixel to which the error value is added from a binarized output value of the notice pixel, an error diffusion unit which diffuses the calculated error value to an untreated pixel which is not yet binarized by the threshold processing unit and positioned at a predetermined position around the notice pixel and a correction processing unit which, when the error value which is diffused by the error diffusion unit is smaller than a first threshold, adds a positive first offset to the error value to perform a correction and outputs the corrected error value to the first add unit.

According to another aspect of the present invention, an image processing method includes inputting a pixel value of a multi-level notice pixel on a pixel to pixel basis by an input unit, first adding an error value which is diffused with respect to a notice pixel to the input value of the multi-level notice pixel which is input from the input unit by a first add unit, second adding a green noise value to the input value which is input from the first add unit by a second add unit, calculating the green noise value to be added to the input value of the notice pixel by using an output value of a treated pixel which is binarized and positioned at a predetermined position around the notice pixel, outputting an binarized output value, the output value being obtained by binarizing the input value of the notice pixel to which the error value and the green noise value are added by using a threshold, calculating an error value due to binarization by subtracting the input value of the notice pixel to which the error value is added from a binarized output value of the notice pixel, diffusing the calculated error value to an untreated pixel which is not yet binarized and positioned at a predetermined position around the notice pixel and correcting the error value to be diffused to the notice pixel by adding a positive first offset to the error value, when the error value which is diffused is smaller than a first threshold.

According to another aspect of the present invention, in a non-transitory computer readable storage medium having stored thereon a program for controlling an image processing of an image processing apparatus, the program executes inputting a pixel value of a multi-level notice pixel on a pixel to pixel basis by an input unit, first adding an error value which is diffused with respect to a notice pixel to the input value of the multi-level notice pixel which is input from the input unit by a first add unit, second adding a green noise value to the input value which is input from the first add unit by a second add unit, calculating the green noise value to be added to the input value of the notice pixel by using an output value of a treated pixel which is binarized and positioned at a predetermined position around the notice pixel, outputting an binarized output value, the output value being obtained by binarizing the input value of the notice pixel to which the error value and the green noise value are added by using a threshold, calculating an error value due to binarization by subtracting the input value of the notice pixel to which the error value is added from a binarized output value of the notice pixel, diffusing the calculated error value to an untreated pixel which is not yet binarized and positioned at a predetermined position around the notice pixel and correcting the error value to be diffused to the notice pixel by adding a positive first offset to the error value, when the error value which is diffused is smaller than a first threshold.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a diagram illustrating a notice pixel and surrounding pixels which are treated by error diffusion processing;

FIG. 3 is a diagram illustrating a notice pixel and surrounding pixels which are not yet treated by the error diffusion processing;

DESCRIPTION OF THE PREFERRED EMBODIMENTS

Hereinafter, embodiments of the present invention will be described with reference to the drawings.

<First Embodiment>

Figure 1:
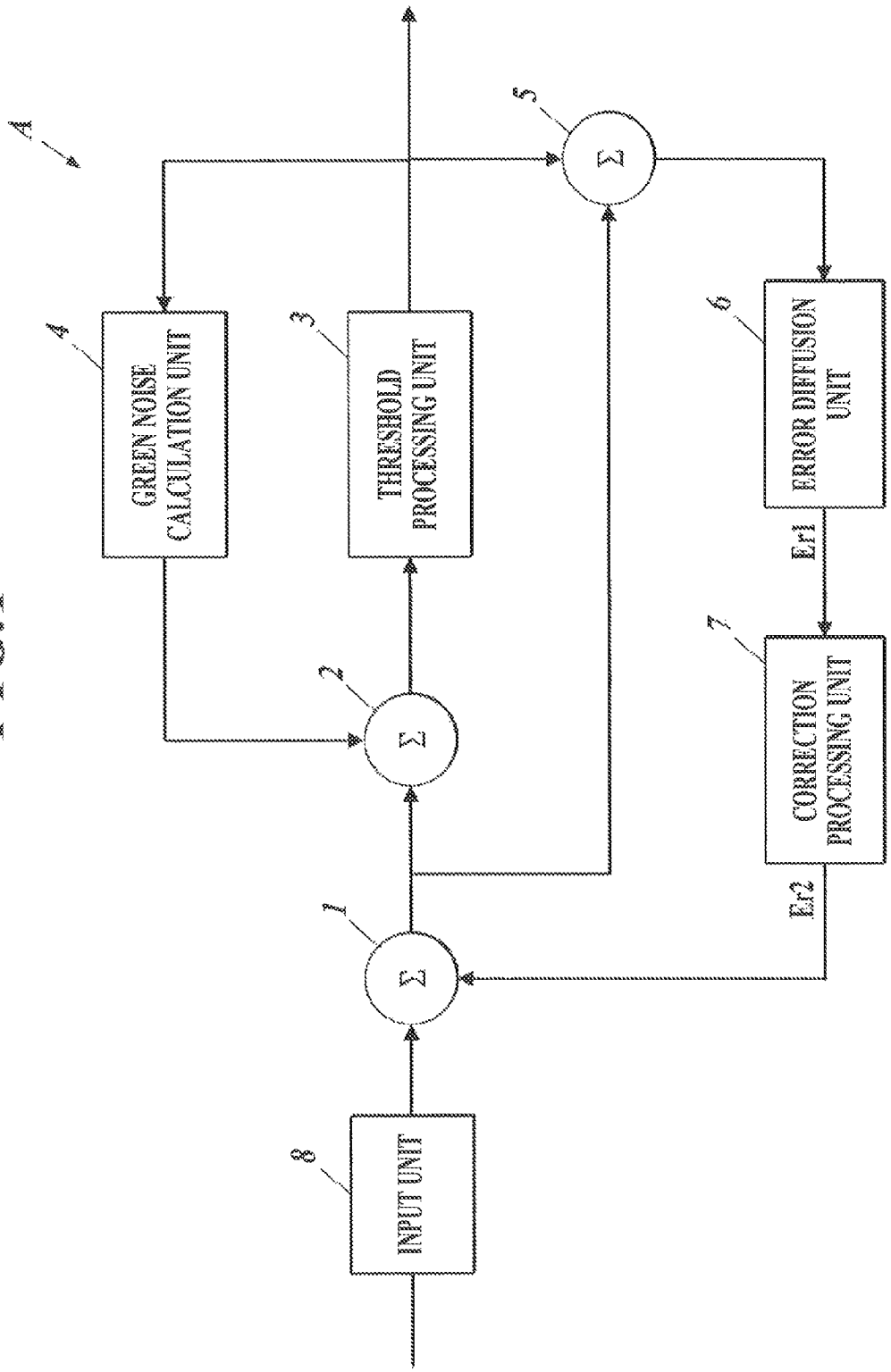
FIG. 1 is a diagram illustrating an image processing apparatus according to a first embodiment of the present invention.

FIG. 1 is a configuration diagram of an image processing apparatus A according to the first embodiment of the present invention.

The image processing apparatus A performs error diffusion processing to a multi-level image which is input and outputs a binary image. Hereinafter, the description will be given by taking a case where the error diffusion processing is performed to a multi-level image having a range between 0 and 255 and a binary image of 0 (dot is not output) or 255 (dot is output; is output as an example.

As shown in FIG. 1f the image processing apparatus A includes a first add unit 1, a. second add unit 2, a threshold processing unit 3, a green noise calculation unit 4, a subtract unit 5, an error diffusion unit 6, a correction processing unit 7 and an input unit 8.

The input unit 8 inputs pixel values of a multi-level image on a pixel to pixel basis.

Multi-level pixel values of an image are input to the first add unit 1 from the input unit 8 on a pixel to pixel basis. The pixel to which the pixel value is input is called a notice pixel. Further, an error value which is diffused to the notice pixel is input to the first add unit 1 via the correction processing unit 7. The error value which is input is an error value corrected by the correction processing unit 7. The first add unit 1 adds the diffused error value to the input value of the notice pixel. The input value to which the error value is added is output to the second add unit 2 and the subtract unit 5.

The second add unit 2 adds the green noise value which is output from the green noise calculation unit 4 to the input value to which the error value is added. The input value to which the error value and the green noise value are added is output to the threshold processing unit 3.

The threshold processing unit 3 binarizes the input value of the notice pixel to which the error value and the green noise value are added by using a threshold. When the input value of the notice pixel to which the error value and the green noise value are added is greater than the threshold which is predetermined for binarization, the threshold processing unit 3 outputs the output value of 255 and when the above input value is smaller than the threshold, the threshold processing unit 3 outputs the output value of 0. The output value of the notice pixel is output to the green noise calculation unit 4 and the subtract unit 5.

The green noise calculation unit 4 uses the output value of the already treated pixel which is binarized by the threshold processing unit 3 and positioned at a predetermined position around the notice pixel to calculate the green noise value to be added to the input value of the notice pixel. One treated pixel or a plurality of treated pixels may be used for calculating the green noise value. In particular, the green noise calculation unit 4 multiplies each output value of treated surrounding pixels by a weighting coefficient predetermined according to each position of the surrounding pixels. The green noise calculation unit 4 multiplies the sum of the obtained multiplied values by a feedback coefficient to obtain a green noise value. The calculated green noise value is output to the second add unit 2 and the calculated green noise value is added to the input value of the notice pixel by the second add unit 2.

Figure 2:
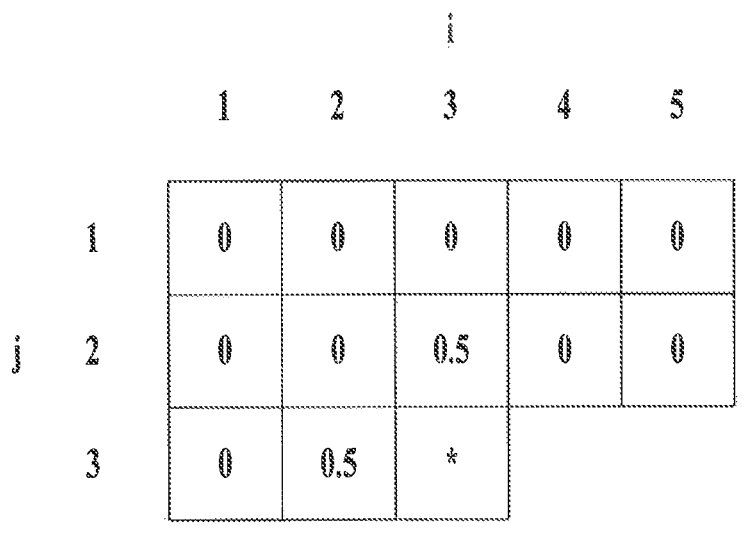

FIG. 2 illustrates an example of weighting coefficients set respectively for the treated surrounding pixels. The "*" mark indicates the notice pixel, "i" indicates the main scanning direction of the image and "j" indicates the sub-scanning direction of the image. The position of each pixel is expressed by (i, j) and the output value thereof is expressed by I(i, j).

According to this example, the weighting coefficient of 0.5 is set only to the surrounding pixels (2,3) and (3,2), and the weighting coefficient of 0 is set for the other surrounding pixels. Therefore, the green noise calculation unit 4 calculates the green noise value g (3,3) to be added to the notice pixel (position (3,3)) as shown in the following formula, $$g(3,3)=\{I(2,3)\times 0.5+I(3,2)\times 0.5\}\times f$$

Here, "f" is the feedback coefficient.

By weighting the output values of the treated surrounding pixels, the green noise value to be added to the input value of the notice pixel readily becomes a large value when the weighted output values of the surrounding pixels are 225. Therefore, the output value of the notice pixel also readily becomes 255. In other words, a dot is readily output in the notice pixel and dots tend to concentrate together with the surrounding pixels.

Further, larger the value of feeding coefficient f, larger the green noise value to be added to the input value of the notice pixel. Therefore, a dot is readily output in the notice pixel, similarly.

The weighting coefficients and the feedback coefficient may be arbitrarily decided by the desired concentration level of dots.

The subtract unit 5 calculates the error value before and after binarization by subtracting the input value of the notice pixel which is output from the first add unit 1 from the output value of the notice pixel which is binarized by the threshold processing unit 3. Here, the input value of the notice pixel which is output from the first add unit 1 is a value obtained by adding the corrected error value diffused in the notice pixel to the input value of the notice pixel. The calculated error value is output to the error diffusion unit 6.

The error diffusion unit 6 diffuses the error value which is input from the subtract unit 5 to an untreated pixel which is not binarized by the threshold processing unit 3 and which is positioned at a predetermined position around the notice pixel. One surrounding pixel or a plurality of surrounding pixels may be used as surrounding pixel to which the error value is diffused. At the time of error diffusion, the error diffusion unit 6 multiplies the error value which is input from the subtract unit 5 by the weighting coefficient. Each of the weighting coefficients is a coefficient which is predetermined according to the position of an untreated surrounding pixel. Each error value obtained by multiplication is output to the first add unit 1 via the correction processing unit 7 when each of the untreated surrounding pixels is to be processed as a notice pixel, and the error value is added to the input values of the surrounding pixels by the first add unit 1.

Figure 3:
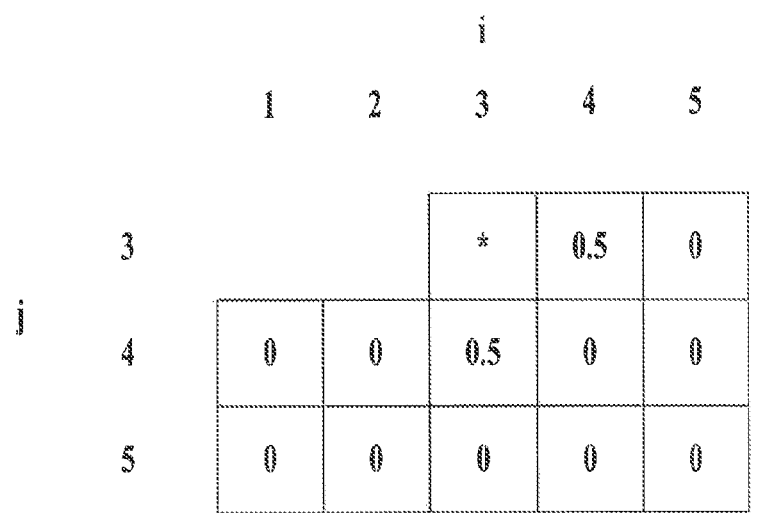

FIG. 3 illustrates an example of weighting coefficients which are set respectively for the untreated surrounding pixels. Similarly to FIG. 2, "*" mark indicates a notice pixel and the position of each pixel is expressed by (i,j), According to this example, the weighting coefficient of 0.5 is set only to surrounding pixels at the positions of (4,3) and (3,4) and the weighting coefficient of 0 is set to the other surrounding pixels. Therefore, the error diffusion unit 6 multiplies the error value which is generated by binarizing the notice pixel by the weighting coefficient of 0.5 to obtain the error value that diffuses to the surrounding pixels at the positions (4,3) and (3,4). The error value obtained by multiplication is added to each of the input values of the surrounding pixels at the positions (4,3) and (3,4) by the first add unit 1.

The correction processing unit 7 corrects the error value that is to be diffused by the error diffusion unit 6. The error value which is input from the error diffusion unit 6 is expressed by Er1 and the error value after correction performed by the correction processing unit 7 is expressed by Er2. At the time of correction processing, when the error value Er1 is smaller than the first threshold Th1, the correction processing unit 7 adds the first offset Off1 to the error value Er1. The first threshold Th1 is a negative constant value and the first offset Off1 is a positive constant value. When the error value Er1 is greater than or equal to the first threshold Th1, the correction processing unit 7 does not perform correction of the error value Er1 and outputs the error value Er1 as it is as the error value Er1. The error value Er2 after correction is output to the first add unit 1 and is diffused to the untreated surrounding pixels.

The first offset Off1 is arbitrarily set. However, it is preferred that the offset Off1 is smaller than or equal to a certain value. When the range of the error value Er1 is −256≦Er1≦255, it is preferred that the first offset Off1 is 10 or smaller empirically. This is to prevent the correction of the error value excessively influencing the pixels which are adjacent to the notice pixel (pixels at the positions (4,3), (2,4), (3,4), (4,4) shown in FIG. 3), That is because when the first offset Off1 is excessively large, the correction itself becomes excessive, and the error which should be transmitted in order to reproduce the original density of an image will not be transmitted. The range of error value Er1 may be different from the range described above due to the range of the pixel value of the image. However, even when the range of error value Er1 is different, it is preferred that the rate of the first offset Off1 with respect to the range of the pixel value is same as that described above.

More preferably, when the error value Er1 is greater that the second threshold Th2, the correction processing unit 7 subtracts the second offset Off2 from the error value Er1. The second threshold Th2 and the second offset Off2 are positive constant values. When the error value Er1 is greater than or equal to the first threshold Th1 and is smaller than or equal to the second threshold Th2, the correction processing unit 7 outputs the error value Er1 as it is as the error value Er2. Similarly to the first offset Off1, it is preferred that the second offset Off2 is smaller than or equal to a certain value, for example, smaller than or equal to 10.

Figure 4:
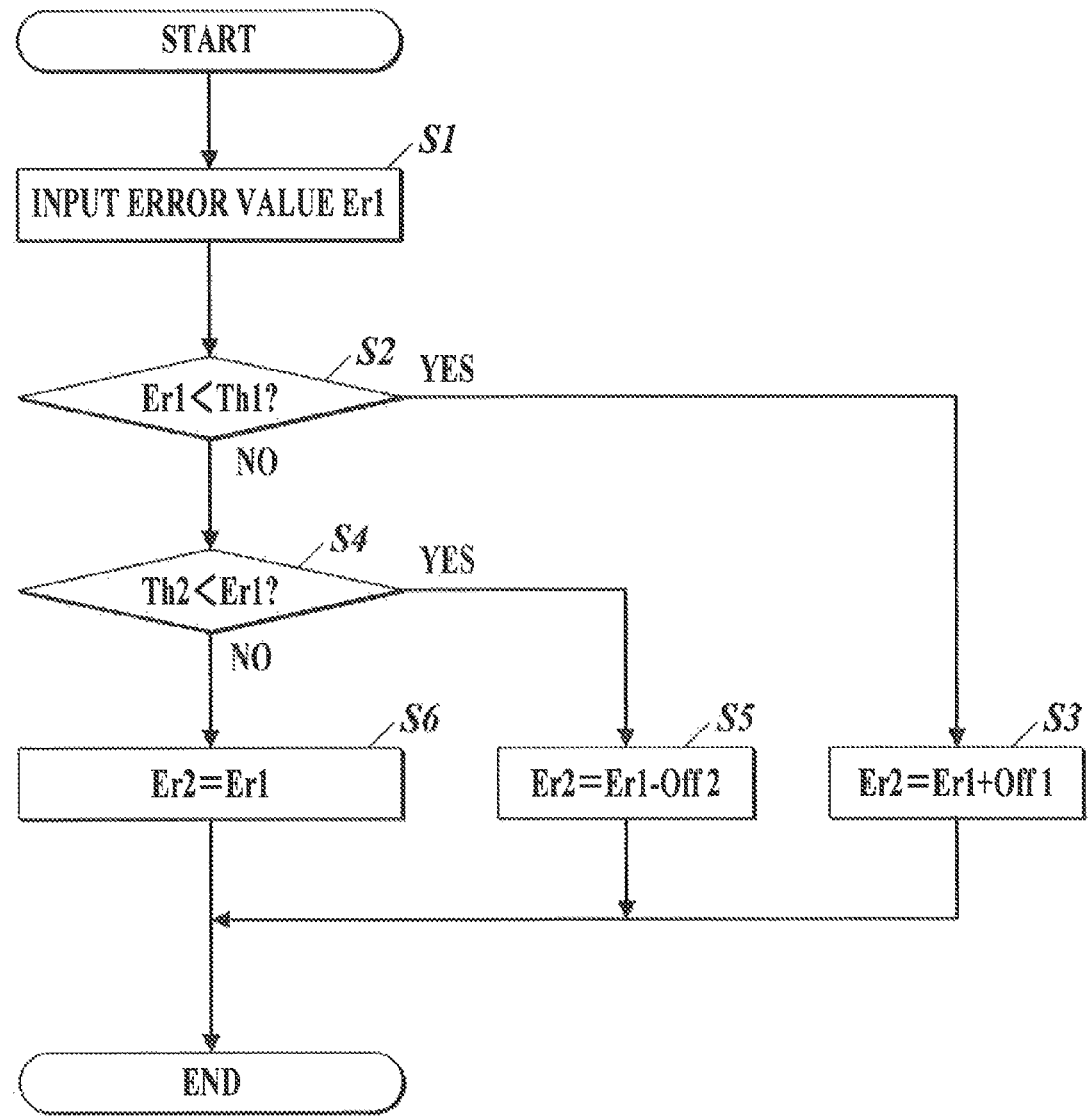
FIG. 4 is a flowchart of correction processing performed by a correction processing unit.

FIG. 4 is a flowchart illustrating the correction processing when using the first threshold Th1 and the second threshold Th2.

As shown in FIG. 4, when the error value Er1 is input from the error diffusion unit 6 to the correction processing unit 7 (step S1), the correction processing unit 7 compares the error value Er1 to the first threshold Th1 (step S2). When the error value Er1 is smaller than the first threshold Th1 (step S2; Y), the correction processing unit 7 adds the first offset Off1 to the error value Er1 to obtain the error value Er2 (step S3).

When the error value Er1 is greater than or equal to the first threshold Th1 (step S2; N), the correction processing unit 7 compares the error value Er1 to the second threshold Th2 (step S4). When the error value Er1 is greater than the second threshold Th2 (step S4; Y), the correction processing unit 7 subtracts the second offset Off2 from the error value Er1 to obtain the error value Er2 (step S5).

When the error value Er1 is smaller than, or equal to the second threshold Th2 (step S4; N), the correction processing unit 7 outputs the error value Er1 as it is as the error value Er2 (step S6).

Figure 5:
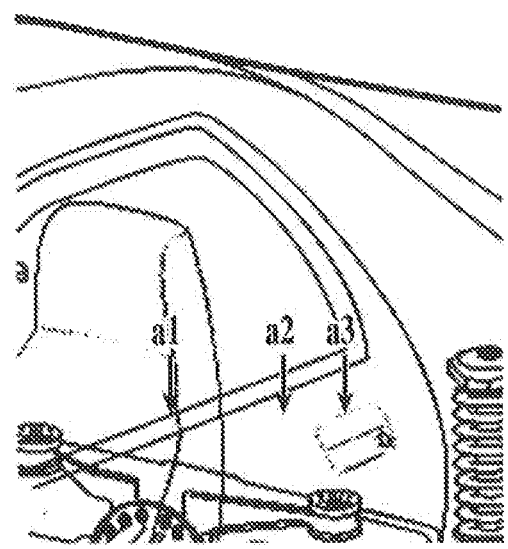
FIG. 5 is a diagram showing a result of treating an image of car seat by a conventional error diffusion processing method.
Figure 6:
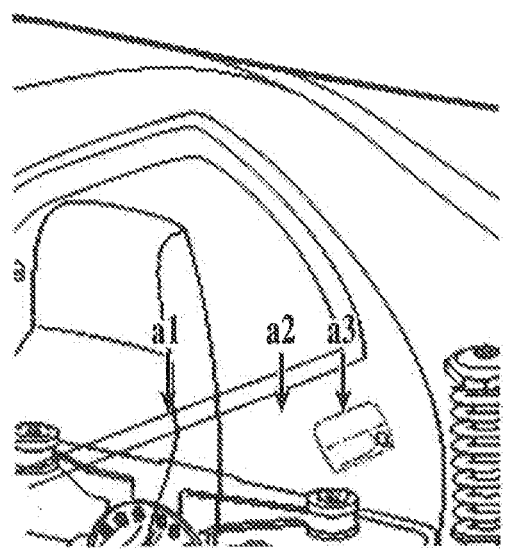
FIG. 6 is a diagram showing a result of treating an image of car seat by an error diffusion processing method according to the present invention.

FIGS. 5 and 6 are diagrams showing a result after treating a monochrome image of car seat with the error diffusion processing. FIG. 5 shows the processing result after the error diffusion processing of a conventional method is performed, and FIG. 6 shows the processing result after the error diffusion processing according to the present invention is performed.

The images shown in FIGS. 5 and 6 are scanned in the order of area a1, area a2 and area a3 and the error diffusion processing is performed. The area a1 has high density, the area a2 has low density and the area a3 has a density of halftone.

According to the conventional error diffusion processing, a large negative error value is generated by the error diffusion processing of the areas a1 and a2. The generated error value is accumulated and held in the area a2 and is transmitted to the area a3 as it is. Thin line images of halftone are included in the area a3. However, because the negative error value is added when performing the error diffusion processing to the thin line images, dots thereof are excessively suppressed from being output. As a result, the thin lines in the area a3 become fragmentary as shown in FIG. 5.

On the other hand, according to the error diffusion processing of the present invention, the first offset Off1 is added to the error value Er1 which is smaller than the first threshold Th1 and the negative error value to be added to the area a3 is alleviated. As a result, dots are properly output in the thin line images as shown in FIG. 6 to reproduce the original thin line images.

Figure 7:
FIG. 7 is a diagram showing a result of treating an image of map by the conventional error diffusion processing method.
Figure 8:
FIG. 8 is a diagram showing a result of treating an image of map by the error diffusion processing method according to the present invention.

FIGS. 7 and 8 are diagrams showing the result of performing the error diffusion processing to a color image of map. FIG. 7 snows the processing result of the error diffusion processing according to the conventional method and FIG. 8 shows the processing result of the error diffusion processing according to the present invention.

The images shown in FIGS. 7 and 8 are scanned in the order of area b1, area b2 and area b3 and the error diffusion processing is performed. The area b1 has nigh density, the area b2 has low density and the area b3 has a density of halftone.

By the same reason as in the example described above with reference to FIG. 5, as a result of the error diffusion processing according to the conventional method, dots which are supposed to be output near the contour line are not output as shown in FIG. 7 and a part of the halftone image in the area b3 is missing.

On the other hand, according to the error diffusion processing according to the present invention, dots are output in the area b3 near the contour line as shown in FIG. 8 and the original halftone image is reproduced.

As described above, the image processing apparatus A of the first embodiment includes the input unit 8 which inputs pixel values of a multi-level image on a pixel to pixel basis, the green noise calculation unit 4 which calculates the green noise value to be added to a notice pixel by using an output value of a treated pixel binarized by the threshold processing unit 3, which is positioned at a predetermined position around the notice pixel, the first add unit 1 which adds the error value diffused to the notice pixel to the input value of the notice pixel, the second add unit 2 which adds the green noise value to the input value of the notice pixel, the threshold processing unit 3 which binarizes the input value of the notice pixel to which the error value and the green noise value are added by a threshold, the subtract unit 5 which subtracts the input value of the notice pixel to which the error value is added from the output value of the notice pixel after being binarized to calculate an error value due to the binarization, the error diffusion unit 6 which diffuses the calculated error value to pixel which is not yet binarized by the threshold processing unit 3, which is positioned at a predetermined position around the notice pixel, and the correction processing unit 7 which corrects the error value Er1 by adding a positive first offset Off1 and output the corrected error value Er2 to the first add unit 1 when the error value Er1 which is diffused by the error diffusion unit 6 is smaller than the first threshold Th1.

Moreover, the first offset Off1 is a constant value.

Thereby, the negative error value Er1 excessively generated by the error diffusion processing which adds the green noise characteristics having high dot concentration can be corrected to be converged to an value that is greater than or equal to the first threshold Th1. By the correction, partial missing in the original image due to excess negative error value Er1 being accumulated and transmitted can be prevented and reproducibility of the image can be improved.

Moreover, when the diffused error value Er1 is greater than the second threshold Th2, the correction processing unit 7 subtracts the positive second offset Off2 from the error value Er1. The second offset Off2 is a constant value.

Thereby, even when excess positive error value Er1 is generated by the error diffusion processing which adds the green noise characteristics, the error value Er2 can be corrected so as to be converged to a value that is smaller than or equal to the second threshold Th2. By the correction, excess increase in density, becoming more dense than the original density, due to the excess positive error value Er2 being accumulated and transmitted can be prevented, and reproducibility of the image can be improved.

<Second Embodiment>

Figure 9:
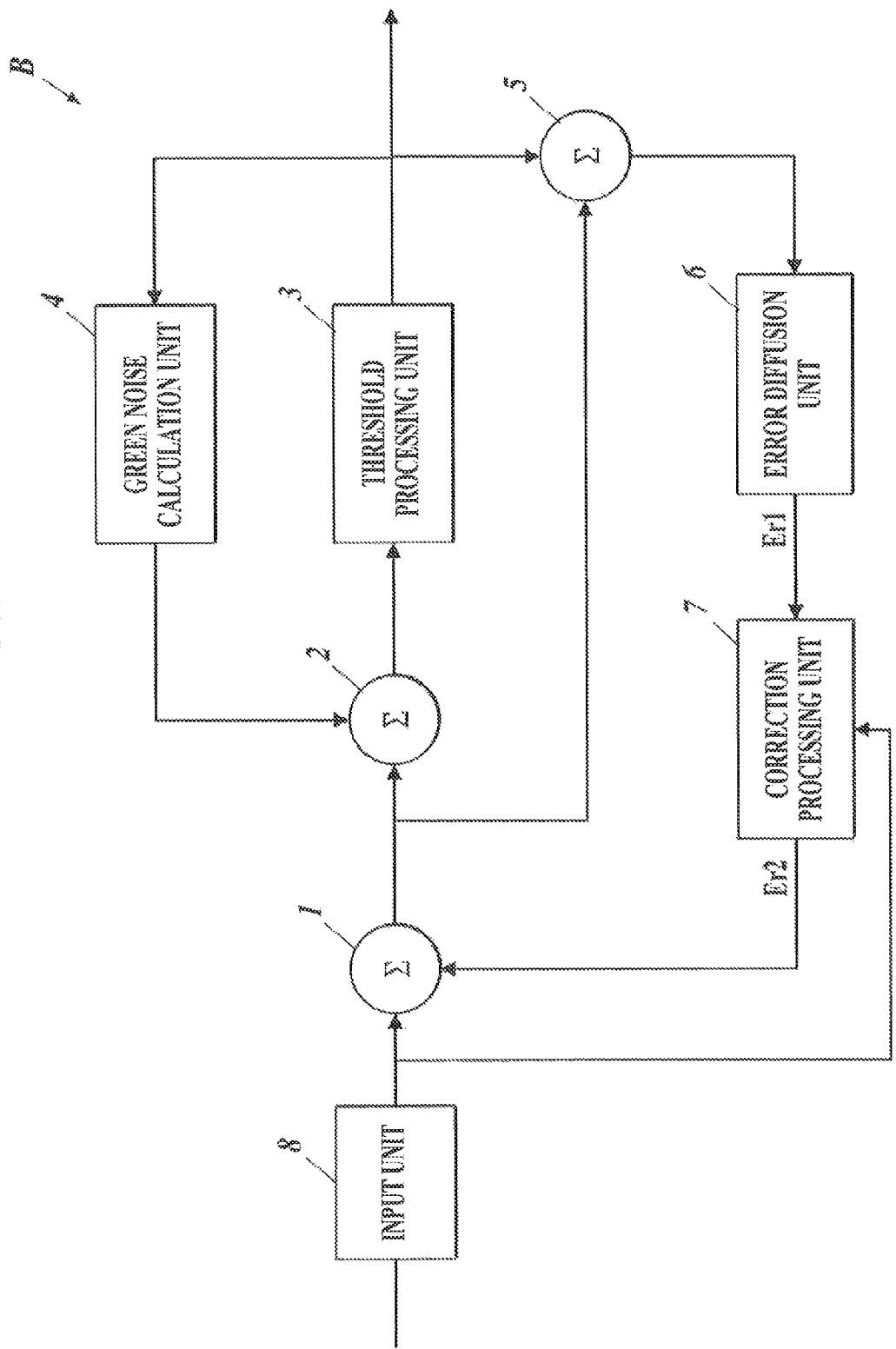
FIG. 9 is a diagram illustrating an image processing apparatus according to a second embodiment of the present invention.

FIG. 9 is a diagram illustrating an image processing apparatus B according to the second embodiment.

The image processing apparatus A according to the first embodiment is configured such that the input value of the notice pixel is input only in the first add unit 1. In contrast, in the image processing apparatus B according to the second embodiment, the input value of the notice pixel is input to the first add unit 1 and the correction processing unit 7. Other basic configuration is the same between the image processing apparatus A and the image processing apparatus B, and only difference is the processing performed by the correction processing unit 7. Therefore, like elements are denoted by like reference numerals and only the processing performed by the correction processing unit 7 will be described.

In the correction processing unit 7 of the image processing apparatus A according to the first embodiment, the first offset Off1 and the second offset Off2 which are positive constant values are used. In contrast, in the correction processing unit 7 of the image processing apparatus B according to the second embodiment, positive variable values which exhibit monotone decreasing according to input value are used as the first offset Off1 and the second offset Off2. The variable values may be obtained by a function having a characteristic in which an output value exhibits monotone decreasing with respect to input value or LUT (Look Up Table).

The phenomenon of missing halftone image occurs when the error diffusion processing is performed to an area of halftone image right after the error diffusion processing being performed to the halftone to high density image area and the low density image area in this order. This is because the negative error value that is generated when the error diffusion processing is performed to the low density image area continuously from the halftone to high density image area is enlarged by the green noise value being added, accumulated without being canceled out and transmitted to the halftone image area. Therefore, in the second embodiment, lower the density, that is, smaller the input value of the notice pixel, greater the first offset Off1 is set in order to prevent the negative error values from being excessively enlarged and accumulated when performing the error diffusion processing of the low density image area. Similarly, it is preferred to use variable values which exhibits monotone decreasing according to input value for the second offset Off2 in order to prevent the positive error value from being excessively enlarged and accumulated.

Figure 10:
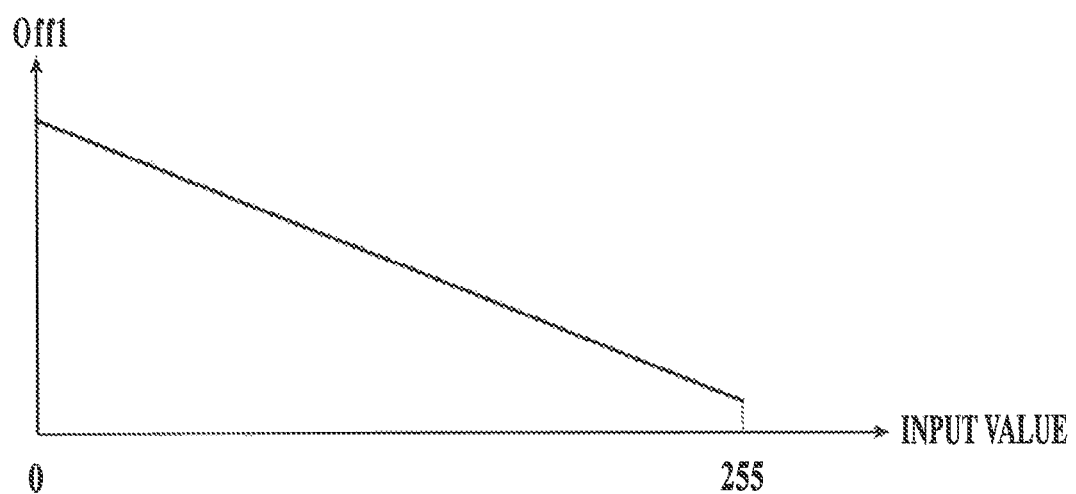
FIG. 10 is a diagram illustrating a function of a first offset which exhibits monotone decreasing with respect to input value.
Figure 11:
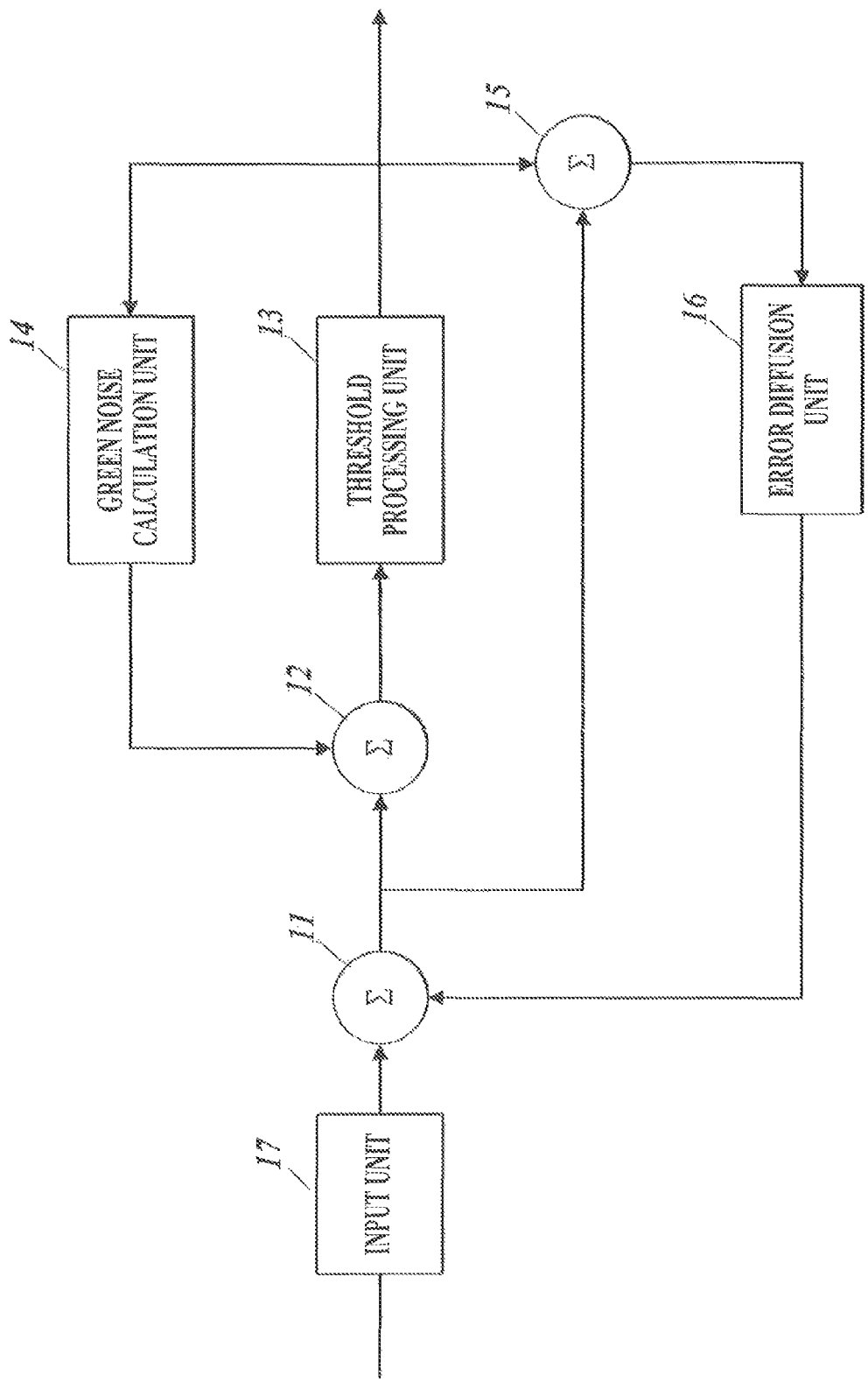
FIG. 11 is a diagram illustrating a conventional configuration of an error diffusion processing circuit.

FIG. 10 illustrates an example of a function used for obtaining the first offset Off1 by the correction processing unit 7.

In FIG. 10, the horizontal axis indicates input value, the horizontal axis indicates the first offset Off1 to be output with respect to input value. As shown in FIG. 10, the function exhibits monotone decreasing and is designed so as to be greater the input value, smaller the first offset Off1. As long as the output value (the first offset Off1) exhibits monotone decreasing with respect to input value, the function may be a straight line or a curved line.

Here, only an example of the first offset Off1 is shown. However, the second offset Off2 may be obtained by such functions having similar characteristics.

The correction processing unit 7 obtains the first offset Off1 or the second offset Off2 corresponding to the input value of the notice pixel, and when the error value Er1 is smaller than the first threshold Th1, the correction processing unit 7 adds the obtained first offset Off1 to the error value Er1. Further, when the error value Er1 is greater than the second threshold Th2, the correction processing unit 7 subtracts the obtained second offset Off2 from the error value Er1.

As described above, the image processing apparatus 3 according to the second embodiment uses a positive variable value which exhibits monotone decreasing according to input value as the first offset value Off1. Therefore, similar advantages as in the image processing apparatus A according to the first embodiment can be obtained, and further, negative error value Er1 can be prevented from, being enlarged and accumulated by making the first offset Off1 be a large value according to a small input value to carry out correction at the time of error diffusion processing of the low density image area when the low density image area continues after the halftone to high density image region and the negative error value Er1 is to accumulate.

Moreover, the image processing apparatus B according to the second embodiment uses a positive variable value which exhibits monotone decreasing according to input value as the second offset Off2. Therefore, in a case where the high density image area continues after the low density image region and positive error value Er1 is accumulated, the positive error value Er1 can be prevented from being enlarged and accumulated by making the second offset Off1 be a large value according to a small input value to carry out correction at the time of error diffusion, processing of the high density image area.

Here, the above described first and second embodiments are examples of the present invention, and the present invention is not limited to these examples.

For example, the above mentioned error diffusion processing and correction processing can be programmed to be software processed. In the case of software processing, the image processing apparatus includes a control unit constituted of a CPU (Central Processing Unit) or the like and a storage unit, and the program stored in the storage unit and the control unit cooperate with each other to execute the software processing. As for a computer readable storage unit for the program, non-volatile memory such as a ROM and flash memory and a portable storage medium such as CD-ROM can be applied.

According to one aspect of the present invention, there is provided an image processing apparatus including an input unit which inputs a pixel value of a multi-level notice pixel on a pixel to pixel basis, a first add unit which adds an error value which is diffused with respect to a notice pixel to the input value of the multi-level notice pixel which is input from the input unit, a second add unit which adds a green noise value to the input value which is input from the first add unit, a threshold processing unit, which outputs an binarized output value, the output value being obtained by binarizing the input value of the notice pixel to which the error value and the green noise value are added by using a threshold, a green noise calculation unit which calculates the green noise value to be added to the input value of the notice pixel by using an output value of a treated pixel which is binarized by the threshold processing unit and positioned at a predetermined position around the notice pixel, a subtract unit which calculates an error value due to binarization by subtracting the input value of the notice pixel to which the error value is added from a binarized output value of the notice pixel, an error diffusion unit which diffuses the calculated error value to an untreated pixel which is not yet binarized by the threshold processing unit and positioned at a predetermined position around the notice pixel and a correction processing unit which, when the error value which is diffused by the error diffusion unit is smaller than a first threshold, adds a positive first offset to the error value to perform a correction and outputs the corrected error value to the first add unit.

According to the present invention, the excess negative error value which is generated by the error diffusion processing which adds the green noise characteristics can be corrected so as to converge to a value smaller than or equal to the first threshold. By the correction, missing of original image due to the excess negative error value being accumulated and transmitted can be prevented, and reproducibility of the image can be improved.

Preferably, when the error value which is diffused is greater than a second threshold, the correction processing unit subtracts a positive second offset from the error value.

Preferably, the first offset and the second offset are constant values.

Preferably, the first offset and the second offset are variable values which exhibit uniform decreasing according to the input value.

According to another aspect of the present invention, there is provided an image processing method including inputting a pixel value of a multi-level notice pixel on a pixel to pixel basis by an input unit, first adding an error value which is diffused with respect to a notice pixel to the input value of the multi-level notice pixel which is input from the input unit by a first add unit, second adding a green noise value to the input value which is input from the first add unit by a second add unit, calculating the green noise value to be added to the input value of the notice pixel by using an output value of a treated pixel which is binarized and positioned at a predetermined position around the notice pixel, outputting an binarized output value, the output value being obtained by binarizing the input value of the notice pixel to which the error value and the green noise value are added by using a threshold, calculating an error value due to binarization by subtracting the input value of the notice pixel to which the error value is added from a binarized output value of the notice pixel, diffusing the calculated error value to an untreated pixel which is not yet binarized and positioned at a predetermined position around the notice pixel and correcting the error value to be diffused to the notice pixel by adding a positive first offset to the error value, when the error value which is diffused is smaller than a first threshold.

According to the present invention, the excess negative error value which is generated by the error diffusion processing which adds the green noise characteristics can be corrected so as to converge to a value smaller than or equal to the first threshold. By the correction, missing of original image due to the excess negative error value being accumulated and transmitted can be prevented, and reproducibility of the image can be improved.

Preferably, in the correcting, a positive second offset is subtracted from the error value when the error value which is diffused is greater than a second threshold.

Preferably, the first offset and the second offset are constant values.

Preferably, the first offset and the second offset are variable values which exhibit uniform decreasing according to the input value.

According to another aspect of the present invention, there is provided a non-transitory computer readable storage medium having stored thereon a program for controlling an image processing of an image processing apparatus in which the program executes inputting a pixel value of a multi-level notice pixel on a pixel to pixel basis by an input unit, first adding an error value which is diffused with respect to a notice pixel to the input value of the multi-level notice pixel which is input from the input unit by a first add unit, second adding a green noise value to the input value which is input from the first add unit by a second add unit, calculating the green noise value to be added to the input value of the notice pixel by using an output value of a treated pixel which is binarized and positioned at a predetermined position around the notice pixel, outputting an binarized output value, the output value being obtained by binarizing the input value of the notice pixel to which the error value and the green noise value are added by using a threshold, calculating an error value due to binarization by subtracting the input value of the notice pixel to which the error value is added from a binarized output value of the notice pixel, diffusing the calculated error value to an untreated pixel which is not yet binarized and positioned at a predetermined position around the notice pixel and correcting the error value to be diffused to the notice pixel by adding a positive first offset to the error value, when the error value which is diffused is smaller than a first threshold.

According to the present invention, the excess negative error value which is generated by the error diffusion processing which adds the green noise characteristics can be corrected so as to converge to a value smaller than or equal to the first threshold. By the correction, missing of original image due to the excess negative error value being accumulated and transmitted can be prevented, and reproducibility of the image can be improved.

Preferably, in the correcting, a positive second offset is subtracted from the error value when the error value which is diffused is greater than a second threshold.

Preferably, the first offset and the second offset are constant values.

Preferably, the first offset and the second offset are variable values which exhibit uniform decreasing according to the input value.

The present U.S. patent application claims a priority under the Paris Convention of Japanese paten application No. 2011-084976 filed on Apr. 7, 2011, which shall be a basis of correction of an incorrect translation.

What is claimed is:

1. An image processing apparatus, comprising:
   an input unit which inputs a pixel value of a multi-level notice pixel on a pixel to pixel basis;
   a first add unit which adds an error value which is diffused with respect to a notice pixel to the input value of the multi-level notice pixel which is input from the input unit;
   a second add unit which adds a green noise value to the input value which is input from the first add unit;
   a threshold processing unit which outputs an binarized output value, the output value being obtained by binarizing the input value of the notice pixel to which the error value and the green noise value are added by using a threshold;
   a green noise calculation unit which calculates the green noise value to be added to the input value of the notice pixel by using an output value of a treated pixel which is binarized by the threshold processing unit and positioned at a predetermined position around the notice pixel;
   a subtract unit which calculates an error value due to binarization by subtracting the input value of the notice pixel to which the error value is added from a binarized output value of the notice pixel;
   an error diffusion unit which diffuses the calculated error value to an untreated pixel which is not yet binarized by the threshold processing unit and positioned at a predetermined position around the notice pixel; and
   a correction processing unit which, when the error value which is diffused by the error diffusion unit is smaller than a first threshold, adds a positive first offset to the error value to perform a correction and outputs the corrected error value to the first add unit.

2. The image processing apparatus of claim 1, wherein when the error value which is diffused is greater than a second threshold, the correction processing unit subtracts a positive second offset from the error value.

3. The image processing apparatus of claim 2, wherein the first offset and the second offset are constant values.

4. The image processing apparatus of claim 2, wherein the first offset and the second offset are variable values which exhibit uniform decreasing according to the input value.

5. An image processing method, comprising:
   inputting a pixel value of a multi-level notice pixel on a pixel to pixel basis by an input unit;
   first adding an error value which is diffused with respect to a notice pixel to the input value of the multi-level notice pixel which is input from the input unit by a first add unit;

second adding a green noise value to the input value which is input from the first add unit by a second add unit;

calculating the green noise value to be added to the input value of the notice pixel by using an output value of a treated pixel which is binarized and positioned at a predetermined position around the notice pixel;

outputting an binarized output value, the output value being obtained by binarizing the input value of the notice pixel to which the error value and the green noise value are added by using a threshold;

calculating an error value due to binarization by subtracting the input value of the notice pixel to which the error value is added from a binarized output value of the notice pixel;

diffusing the calculated error value to an untreated pixel which is not yet binarized and positioned at a predetermined position around the notice pixel; and correcting the error value to be diffused to the notice pixel by adding a positive first offset to the error value, when the error value which is diffused is smaller than a first threshold.

6. The image processing method of claim 5, wherein in the correcting, a positive second offset is subtracted from the error value when the error value which is diffused is greater than a second threshold.

7. The image processing method of claim 6, wherein the first offset and the second offset are constant values.

8. The image processing method of claim 6, wherein the first offset and the second offset are variable values which exhibit uniform decreasing according to the input value.

9. A non-transitory computer readable storage medium having stored thereon a program for controlling an image processing of an image processing apparatus, the program executes:

inputting a pixel value of a multi-level notice pixel on a pixel to pixel basis by an input unit;

first adding an error value which is diffused with respect to a notice pixel to the input value of the multi-level notice pixel which is input from the input unit by a first add unit;

second adding a green noise value to the input value which is input from the first add unit by a second add unit;

calculating the green noise value to be added to the input value of the notice pixel by using an output value of a treated pixel which is binarized and positioned at a predetermined position around, the notice pixel;

outputting an binarized output value, the output value being obtained by binarizing the input value of the notice pixel to which the error value and the green noise value are added by using a threshold;

calculating an error value due to binarization by subtracting the input value of the notice pixel to which the error value is added from a binarized output value of the notice pixel;

diffusing the calculated error value to an untreated pixel which is not yet binarized and positioned at a predetermined position around the notice pixel; and correcting the error value to be diffused to the notice pixel by adding a positive first offset to the error value, when the error value which is diffused is smaller than a first threshold.

10. The non-transitory computer readable storage medium of claim 9, wherein in the correcting, a positive second offset is subtracted from the error value when the error value which is diffused is greater than a second threshold.

11. The non-transitory computer readable storage medium of claim 10, wherein the first offset and the second offset are constant values.

12. The non-transitory computer readable storage medium of claim 10, wherein the first offset and the second offset are variable values which exhibit uniform decreasing according to the input value.

\* \* \* \* \*